May 6, 1941. M. C. SHAW 2,241,330
COMPRESSOR CONTROL SYSTEM
Filed Nov. 1, 1939 2 Sheets-Sheet 1

Inventor
M. C. Shaw
by
Attorney

May 6, 1941.　　　　M. C. SHAW　　　　2,241,330
COMPRESSOR CONTROL SYSTEM
Filed Nov. 1, 1939　　　　2 Sheets-Sheet 2
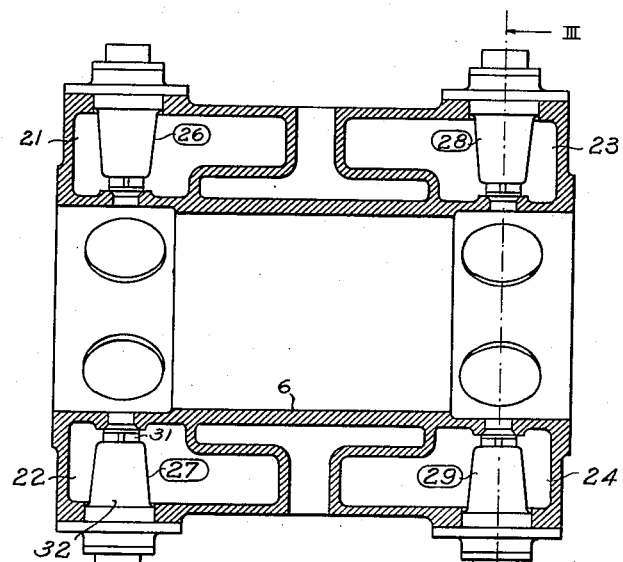
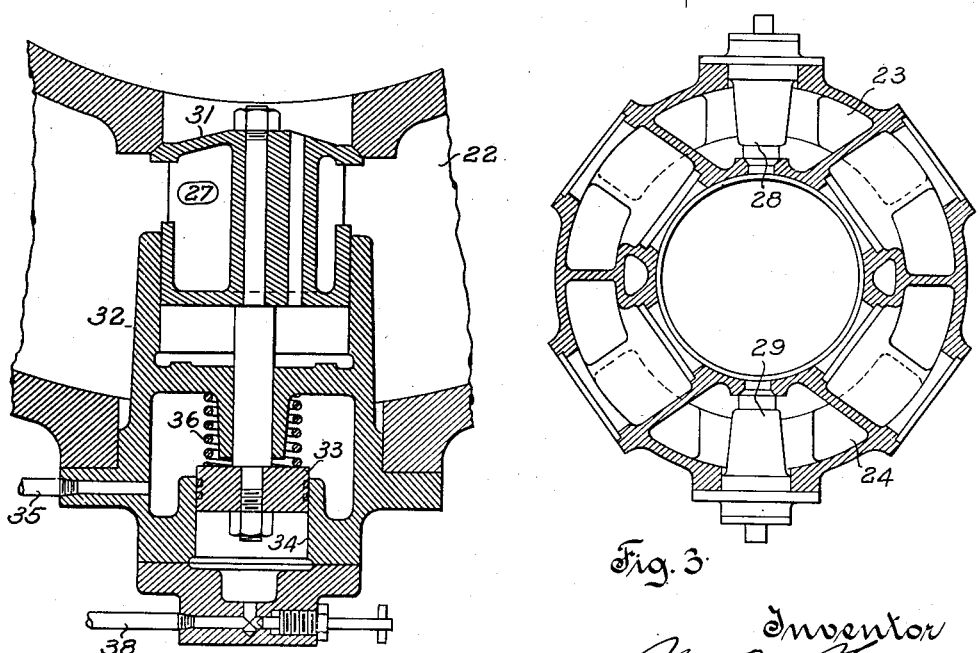
Inventor
M. C. Shaw
by
Attorney Patented May 6, 1941

2,241,330

UNITED STATES PATENT OFFICE 2,241,330

COMPRESSOR CONTROL SYSTEM

Melvin C. Shaw, Wauwatosa, Wis., assignor to Allis-Chalmers Manufacturing Company, Milwaukee, Wis., a corporation of Delaware Application November 1, 1939, Serial No. 302,294

5 Claims. (Cl. 230—21)

This invention relates to improvements in systems for controlling the output capacity of a gas compressor of the reciprocating piston type and more particularly to a system by which so-called clearance pockets in the compressor cylinder structure are automatically placed in communication with or cut off from communication with the cylinder in which the piston reciprocates, for the purpose of varying the volume of the space into which the gas is compressed and hence varying the output of the compressor.

There are numerous methods known to the art by which the output of a gas compressor of the reciprocating piston type may be controlled. The use of spaces or so-called clearance pockets in the compressor structure which may be opened to the piston cylinder of the compressor is the most favored of such methods for the reason that constant speed reciprocation of the piston may be maintained while the output of the compressor may be readily controlled by the control valves between the several pockets and the compressor cylinder. Clearance pocket control of the compressor output acts in steps dependent on the number of pockets and such pockets must therefore be positively opened and closed as required to control the volume variation as the demand for the compressed gas and hence the output pressure varies. The opening and closing of clearance pockets is preferably obtained by valves operable by fluid pressure and such fluid pressure must be accurately controlled and distributed to the several valves in a predetermined sequence. A regulator must be provided responsive to the compressor output pressure and operable to control the fluid pressure distributing means which must act with little time delay to apply or to cut off the pressure quickly from the pocket valves. It is of course preferable that the pressure responsive portion of the regulator be required to produce only a small force thereby maintaining its sensitivity. Hence the regulator is preferably employed only to control a servomotor which operates the valve controlling pressure distributing means. In addition to the pressure responsive portion and the servomotor controlling portion of the regulator, an interconnection should also be provided between the regulator and the pressure distributing means operated thereby, which interconnection must serve the purpose of bringing at least the servomotor control portion of the regulator back to the mid-position or neutral position substantially simultaneously with the movement of the pressure distributing means to any given position.

It is therefore one of the objects of the present invention to provide a control system for the clearance pockets of a reciprocating piston compressor which includes a compressor output pressure responsive portion required only to produce a sufficient force for operating another portion controlling the flow of the fluid pressure to a servomotor.

Another object of the invention is to provide a control system for the clearance pockets of a reciprocating piston compressor in which the operating and control means for the clearance pocket valves is interconnected with a regulator to secure substantially immediate return of the entire control system to the neutral position after each controlling operation thereof.

Another object of the invention is to provide a control system for the clearance pockets of a reciprocating piston compressor in which the output pressure of the compressor is employed for actuating both a regulator responsive thereto and the clearance pocket valves of the compressor and a separate source of pressure is used to actuate the means for distributing the output pressure to the operating means of the clearance pocket valves.

Objects and advantages other than those above set forth will be apparent from the following description when read in connection with the accompanying drawings in which:

Fig. 1 is an illustration in elevation of one cylinder of a gas compressor of the reciprocating piston type discharging into a receiver and shown as being provided with four clearance pockets which may be placed in communication with the compressor cylinder under the several control of valves which are operated by fluid pressure applied to the valves by a control system, diagrammatically shown, responsive to a predetermined pressure in the receiver;

Fig. 2 is a cross sectional view taken on a vertical plane through the longitudinal axis of the cylinder of the compressor to aid in illustrating the form and location of the clearance pockets in the compressor structure;

Fig. 3 is a vertical sectional view taken on the plane III—III of Fig. 2; and

Fig. 4 is a vertical sectional view, in enlarged detail, through one of the fluid pressure operated valves controlling communication of the clearance pockets with the compressor cylinder to illustrate the detailed construction of such valves.

Figure 1:
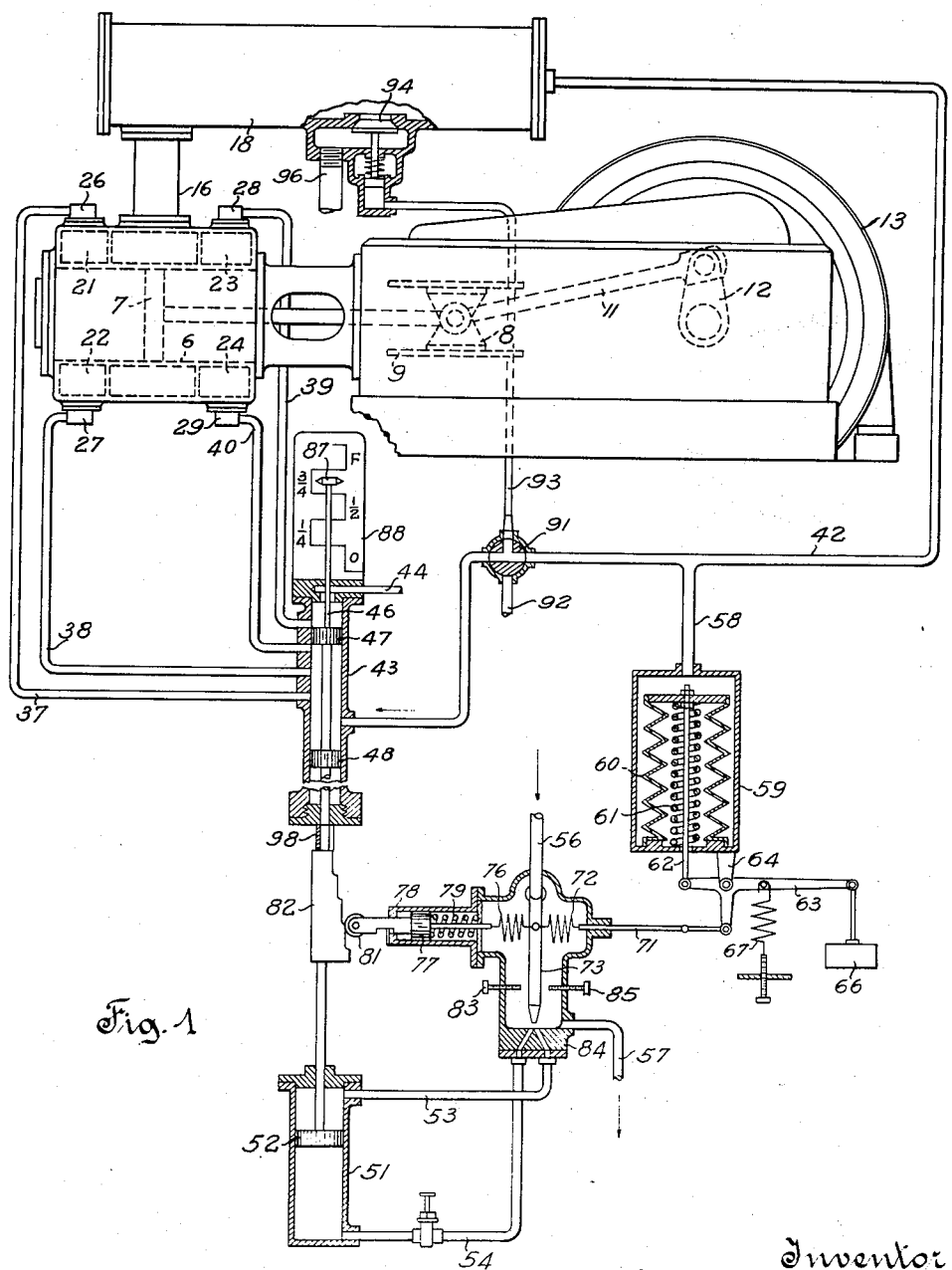

Referring more particularly to the drawings by characters of reference, the reference numeral 6 designates a cylinder in which a piston 7 is reciprocated by a suitable driving means including a crosshead 8 sliding in guides 9 and connected by a rod 11 and a crank 12 to the shaft of a driving motor 13. The cylinder discharges through a discharge pipe 16 into a receiver 18 from which the compressed air or other gas is drawn, by piping not shown, to the points of use as is well known. The cylinder structure includes a plurality of spaces forming so-called clearance pockets 21, 22, 23 and 24 formed between the wall of the cylinder 6 and the exterior wall of the cylinder structure which also includes the spaces to which a suitable circulating liquid is supplied for removing a predetermined amount of the heat produced by the compression of the gas in the cylinder. The several clearance pockets are preferably non-uniform in size and are of such volume that the air delivery is reduced by four equal decrements. Although four pockets have been shown it will be understood that a lesser number may be used, thus only two pockets are needed for so-called three step control. Communication of pockets 21, 22, 23 and 24 with the cylinder 6 is controlled respectively by valves generally indicated at 26, 27, 28 and 29 and which are preferably of similar construction. Referring to Fig. 4, it will be seen that the valves 26, 27, 28 and 29 each comprise a valve body 31 guided in a cylinder 32, with the valve body connected with a piston 33 moving in a cylinder 34, the piston 33 and cylinder 34 forming a fluid pressure operable servomotor for closing valve body 31 on a seat against the action of a compression spring 36 which tends to open the clearance pockets to the cylinder 6 by moving valve 31 from its seat. It will be apparent that any suitable type of valve may be used which is operable by fluid pressure in either or in both directions of the valve movement.

The clearance pockets 26, 27, 28 and 29 are connected respectively by pipes 37, 38, 39 and 40 through a pilot valve with the receiver 18 by a pipe 42. The pilot valve comprises a cylindrical casing 43 from which pressure is discharged by way of a pipe 44. The port of the inlet connection 42 into the valve casing 43 and the ports of the connections 37, 38, 39 and 40 to the several clearance pocket valves are controlled by pistons 47 and 48 fitting closely in casing 43 and mounted on a stem extending from the valve casing in both directions. In normal operation, the valve piston 47 opens ports to the pressure line 42 thus allowing action of pressure under the pistons of the pocket valves 26, 27, 28 and 29, to close one or more of such valves against spring action, as may be required to obtain the desired volume of air discharged from the compressor. The pilot valve is operated by a servomotor comprising a cylinder 51 into which is fitted a piston 52 mounted on an extension of the pilot valve stem 46. Fluid pressure is supplied to and discharged from the servomotor 51, 52 by way of pipes 53 and 54 under the control of a regulator receiving the pressure from a suitable source through the pipe 56 and discharging the pressure to a suitable sump through pipe 57.

The regulator includes an adjustable receiver pressure actuated portion which adjusts another portion for controlling the supply of fluid pressure to one side or the other side of the servomotor 51, 52 and also includes means for interconnecting the pilot valve stem 46 with the pressure controlling portion for returning the same to the midposition after each operation thereof. Pressure from the receiver 18 is transmitted from pipe 42 through pipe 58 to a closed casing 59 which contains a flexible bellows 60 under the action of a spring 61 which tends to keep the bellows expanded against pressure from the receiver tending to compress the bellows. Movement of the bellows is transmitted through rod 62 to the bell crank lever 63 fulcrumed on an extension 64 from the bellows casing 59. Adjustment of the action of spring 61 within coarse limits is obtained by variation of a weight 66 pendent from the free end of the bell crank 63 and is obtained within fine limits by adjustment of a tension spring 67 tending to further pull the bell crank 63 downwardly. The differential between the receiver pressure tending to compress the bellows and the adjustment of spring 61 tends to allow expansion of the bellows and thus acts on the bell crank 63. The rocking of the bell crank 63 is transmitted through rod 71 to spring 72 and to a nozzle pipe 73 connected with the fluid pressure supply pipe 56. The nozzle pipe 73 is biased for movement in a clockwise direction by a spring 76 connected with a guide 77 moving in a cylinder 78 against a spring 79 upon movement of a roller 81 mounted on the guide rod, over a stepped cam 82 which is mounted on the extension of the pilot valve stem 46. The spring 79 keeps roller 81 in contact with cam 82 and acts through the guide 77 on spring 76 to bias the nozzle pipe 73 for movement between limits set by the stop 83, in a clockwise direction. Nozzle pipe 73 extends toward an orifice block 84 containing two passageways connecting with pipes 53 and 54 respectively and merging into an orifice adjacent the surface of the block with a splitting edge between the two passageways.

The upper end of the pilot valve stem 46 is extended through cylinder 43 of the valve and bears a pointer 87 which moves over a panel 88 fixedly mounted on the pilot valve or adjacent thereto. The panel has marked thereon the five steps of capacity, 0, ¼, ½, ¾, full, which it is possible to obtain by means of the pressure control herein disclosed thus providing a convenient visible indication of the condition of the compressor and the control system at any given time.

The pressure supply pipe 42 is provided with a three way valve 91 by which pipe 42 may be vented to atmosphere through a pipe 92. Valve 91 is also connected by a pipe 93 with the piston operating a fluid pressure closed valve 94 which controls venting of receiver 18 to atmosphere through a pipe 96. Valve 94 is similar in construction to the clearance pocket valves shown in detail in Fig. 4 and accordingly need not be described in detail. When the compressor is to be started from standstill, valve 91 is turned to connect pilot valve 43, 47, 48 to atmosphere and to relieve pressure holding valve 94 closed. The valves 21, 22, 23 and 24 as well as valve 94 are then opened by spring action to allow starting of the compressor with the cylinders unloaded and with the receiver pressure discharged.

In the position shown in Fig. 1 of the drawings, the compressor is operating at three-quarters of full capacity for the reason that a split collar 98 on the pilot valve stem limits movement of the pilot valve and the pilot valve piston or plug 47 shuts off the supply of pressure from the receiver 18 and pipe 42 to pipe 39 and valve 28. Spring 36 of valve 28 therefore has opened valve body 31 of valve 28 which reduces the amount of gas otherwise compressed on the right hand side of the compressor piston 7 by one-half (one-quarter of the total capacity of the cylinder) because the effective volume of the cylinder on one side of the piston is increased. The pressure produced on the right hand stroke of the piston therefore does not rise to the pressure required for discharge into the receiver until such time in the piston stroke that the quantity delivered is approximately only one-half of the volume delivered when the pocket 23 is closed. On the return stroke of the piston, the gas in the pocket merely reexpands until the pressure drops to a point at which further gas is drawn into the cylinder. The remaining valves 26, 27 and 29 close off pockets 21, 22 and 24 respectively for the reason that gas pressure is still admitted through the pilot valve from the receiver 18 through pipe 42 to pipes 37, 38 and 40 to keep the pistons 33 of such valves in the closed position indicated in Fig. 4.

As the pressure in receiver 18 increases, the control system operates to open a greater number of clearance pockets to the compression cylinder 6 until the pressure is again at the predetermined value in the receiver. Assuming therefore that the demand for pressure is reduced to one-quarter of total compressor capacity from the three-quarter operating position shown, even through the demand is reduced, the compressor continues to operate for a time at three-quarter capacity and the pressure in the receiver 18 increases. The increased pressure acts to compress bellows 60 which depresses its connection to the bell crank 63 to allow spring 72 to swing nozzle pipe 73 in a counterclockwise direction. The nozzle pipe 73 therefore comes into more nearly exact alinement with the passage through the nozzle block 84 leading to the pipe 53. A greater degree of the total oil pressure available is then transmitted through pipe 53 to the upper side of the servomotor piston 52 which moves down and draws the plugs 47 and 48 down until pipes 40 and 38 are successively shut off from the pressure supply pipe 42 and are open to the discharge pipe 44. Pressure is thus released from under the pistons 33 of valves 29 and 27 successively and such valves are opened by their springs 36 to place clearance pockets 24 and 22 respectively in communication with the compressor cylinder 6 which then entirely eliminates any compressing action on the right hand side of the piston 7 and also reduces the compressor capacity on the left hand side of the piston 7 by one-half (one-quarter of the total capacity of the cylinder 6). The only compressing accomplished is therefore one-quarter of the total capacity and is all accomplished on the left hand side of the piston 7.

During the time the servomotor piston 52 is moving the pilot valve plugs 47 and 48 downwardly as above described, the cam 82 is also moved downwardly by two steps and spring 79 causes roller 81 to follow the cam to the lower steps. The profile of cam 82 is such that, when a change in receiver pressure produces movement of bell crank 63 and rotaton of nozzle pipe 73 to cause movement of servomotor piston 52, the resultant position of the cam causes spring 76 to exactly balance spring 72 and the nozzle pipe 73 is returned to mid-position where pressure delivered to the passages in the orifice block 84 is balanced. Use of a stepped cam allows relatively large pressure changes to be attained with very slight movements of piston 52. But when the pressure has reached a predetermined point, the piston 52 moves the cam 82 immediately to the next step before a restoring tension can be placed on spring 76. Any tendency is thus avoided for the control system to remain in a position in which the pocket valves might open and close under small pressure pulsations found in every reciprocating compressor discharge line. The so-called "chattering" of pocket valves heretofore found in reciprocating compressor installations is therefore avoided. An action similar to that above described takes place whenever a reduction in the amount of gas is desired and a reverse action takes place whenever a greater amount of gas is used thus reducing the available pressure in the receiver.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a system for controlling the output of a reciprocating compressor, a plurality of pockets for varying the volume of the compressor, fluid pressure actuated valves for severally opening and shutting said pockets, a pivot valve for controlling the supply to and the discharge of fluid pressure from said valves, a fluid pressure operated servomotor for operating said pilot valve, a movable nozzle for applying pressure to said servomotor, and a flexible diaphragm responsive to the output pressure from the compressor for controlling said servomotor.

2. In a system for controlling the output of a reciprocating compressor, a plurality of pockets for varying the volume of the compressor, fluid pressure actuated valves for severally opening and shutting said pockets, a pilot valve for controlling the supply to and the discharge of fluid pressure from said valves, means for operating said pilot valve, a regulator responsive to the output pressure from the compressor for controlling and actuating said pilot valve operating means, and means mounted on and actuated by said pilot valve stem for returning the pilot valve controlling portion of said regulator to the neutral position thereof.

3. In a system for controlling the output of a reciprocating compressor, a plurality of pockets for varying the volume of the compressor, fluid pressure actuated valves for severally opening and shutting said pockets, a pilot valve for controlling the supply to and the discharge of fluid pressure from said valves, means for operating said pilot valve, a regulator responsive to the output pressure from the compressor for controlling and actuating said pilot valve operating means, a cam mounted on said pilot valve stem, and a spring pressed roller connecting said cam with the pilot valve controlling portion of said regulator for returning said portion to the neutral position thereof.

4. In a system for controlling the output of a reciprocating compressor, a plurality of pockets for varying the volume of the compressor, fluid pressure actuated valves for severally opening and shutting said pockets, a pilot valve for controlling the supply to and the discharge of fluid pressure from said valves, a fluid pressure operated servomotor for operating said pilot valve, a movable nozzle for applying pressure to said servomotor, and a flexible diaphragm responsive to the output pressure from the compressor for controlling said servomotor, a cam mounted on said pilot valve stem, a spring pressed roller connecting said cam with said nozzle for returning said nozzle to the neutral position thereof after operation of said pilot valve, and an indicator for continuously showing the position of said pilot valve.

5. In a system for controlling the output of a reciprocating compressor discharging into a receiver, a plurality of pockets for varying the volume of said compressor, fluid pressure operated valves for severally opening and shutting said pockets, a pilot valve for controlling the supply to and the discharge of fluid pressure from said valves, a fluid pressure operated servomotor for operating said pilot valve, a movable nozzle for applying pressure to said servomotor, a flexible diaphragm responsive to the pressure in said receiver for controlling said servomotor, a cam mounted on the stem of said pilot valve, a spring pressed roller connecting said cam with said nozzle for returning said nozzle to the neutral position thereof after operation of said pilot valve, and an indicator including a scale and a pointer mounted on the stem of said pilot valve and movable over said scale for continuously showing the position of said pilot valve.

MELVIN C. SHAW.

CERTIFICATE OF CORRECTION.

Patent No. 2,241,330. May 6, 1941.

MELVIN C. SHAW.

It is hereby certified that error appears in the printed specification of the above numbered patent requiring correction as follows: Page 3, second column, line 28, claim 1, for the word "pivot" read --pilot--; and that the said Letters Patent should be read with this correction therein that the same may conform to the record of the case in the Patent Office.

Signed and sealed this 10th day of June, A. D. 1941.

(Seal)

Henry Van Arsdale,
Acting Commissioner of Patents.